(12) United States Patent
Kim

(10) Patent No.: US 9,024,565 B2
(45) Date of Patent: May 5, 2015

(54) ANTI-REBOUNDING CONTROL APPARATUS AND METHOD IN AN ELECTRICAL SWING SYSTEM OF A HYBRID EXCAVATOR

(75) Inventor: Ji-Yun Kim, Changwon-si (KR)

(73) Assignee: Volvo Construction Equipment AB (JP)

( * ) Notice: Subject to any disclaimer, the term of this patent is extended or adjusted under 35 U.S.C. 154(b) by 72 days.

(21) Appl. No.: 14/002,039

(22) PCT Filed: Mar. 23, 2011

(86) PCT No.: PCT/KR2011/001985
§ 371 (c)(1),
(2), (4) Date: Aug. 28, 2013

(87) PCT Pub. No.: WO2012/128402
PCT Pub. Date: Sep. 27, 2012

(65) Prior Publication Data
US 2013/0334999 A1    Dec. 19, 2013

(51) Int. Cl.
*H02P 1/00* (2006.01)
*H02P 3/02* (2006.01)
(Continued)

(52) U.S. Cl.
CPC ...... *H02P 3/02* (2013.01); *B60W 20/00* (2013.01); *B60W 2300/17* (2013.01); *B60Y 2200/412* (2013.01); *E02F 9/123* (2013.01); *E02F 9/2095* (2013.01)

(58) Field of Classification Search
USPC ........... 318/519, 520, 615, 616, 617, 400.06, 318/400.07, 432, 461
See application file for complete search history.

(56) References Cited

U.S. PATENT DOCUMENTS 5,076,381 A * 12/1991 Daido et al. .................. 180/446
5,414,339 A * 5/1995 Masaki et al. ................ 318/800
(Continued)

FOREIGN PATENT DOCUMENTS

JP  2005-012900 A   1/2005
JP  2007-218111 A   8/2007
(Continued)

OTHER PUBLICATIONS

International Search Report (in Korean and English) and Written Opinion (in Korean) for PCT/KR2011/001985, mailed Jan. 2, 2012; ISA/KR.

(Continued)

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

An anti-rebounding control apparatus is provided, which includes an anti-rebounding controller outputting a first command for setting a torque limit value to "0" if an electric motor speed value is equal to or smaller than an upper threshold value and equal to or larger than a lower threshold value in the case where a speed command value of "0" is input and outputting a second command for setting the torque limit value to a maximum value if the electric motor speed value is smaller than the lower threshold value, a torque regulator setting the torque limit value to "0" when the first command is input and setting the torque limit value to the maximum value when the second command is input, and an electric motor inverter intercepting a power that is supplied to an electric motor if the torque limit value is set to "0" and re-supplying the power to the electric motor if the torque limit value is set to the maximum value. Accordingly, the same performance as an anti-rebounding system that is used in a swing system of an existing hydraulic excavator can be implemented even in a system that performs a swing operation using an electric motor such as a hybrid (or electric) excavator.

5 Claims, 2 Drawing Sheets

(51) Int. Cl.
*E02F 9/12* (2006.01)
*E02F 9/20* (2006.01)
*B60W 20/00* (2006.01)

(56) References Cited

U.S. PATENT DOCUMENTS

| | | | |
|---|---|---|---|
| 6,021,251 A * | 2/2000 | Hammer et al. | 388/801 |
| 6,639,370 B1 * | 10/2003 | Gabrys | 318/161 |
| 7,362,071 B2 | 4/2008 | Morinaga et al. | |
| 2007/0216331 A1 | 9/2007 | Morinaga et al. | |
| 2009/0320461 A1 | 12/2009 | Morinaga et al. | |
| 2013/0119784 A1 | 5/2013 | Kim et al. | |
| 2014/0191690 A1 * | 7/2014 | Yanagisawa | 318/9 |

FOREIGN PATENT DOCUMENTS

| | | |
|---|---|---|
| JP | 2010-215369 A | 9/2010 |
| KR | 10-0834799 B1 | 6/2008 |

OTHER PUBLICATIONS

International Preliminary Report on Patentability (Chapter II) (in Korean) for PCT/KR2011/001985, dated Jul. 29, 2013; IPEA/KR.

\* cited by examiner

SYSTEM WITH ANTI-REBOUNDING CONTROLLER

SYSTEM WITH NO ANTI-REBOUNDING CONTROLLER

ANTI-REBOUNDING CONTROL APPARATUS AND METHOD IN AN ELECTRICAL SWING SYSTEM OF A HYBRID EXCAVATOR

FIELD OF THE INVENTION

The present invention relates to an anti-rebounding control apparatus and method in an electric swing system of a hybrid excavator. More particularly, the present invention relates to an anti-rebounding control apparatus and method in an electric swing system of a hybrid excavator, which can implement an anti-rebounding control system in an electric motor system, and can realize the same performance as that of an anti-rebounding system that is used in a swing system of an existing hydraulic excavator even in the system that performs a swing operation using an electric motor such as a hybrid (or electric) excavator.

BACKGROUND OF THE INVENTION

An anti-rebounding system that is used in a hydraulic excavator in the related art is a hydraulic circuit system that is configured to stop an upper swing structure of the excavator without bounding in the case of stopping the upper swing structure. This system is also necessary even in a hybrid excavator or an electric excavator system, which performs a swing operation using an electric motor.

DETAILED DESCRIPTION OF THE INVENTION

Technical Problems

Therefore, the present invention has been made to solve the above-mentioned problems occurring in the related art, and one embodiment of the present invention is related to an anti-rebounding control apparatus and method in an electric swing system of a hybrid excavator, which can implement an anti-rebounding control system even in an electric motor swing control system of a hybrid excavator or an electric excavator, and can realize the same performance as that of an anti-rebounding system that is implemented in the existing hydraulic system through controlling an electric motor inverter for controlling the operation of an electric motor using an anti-rebounding control algorithm implemented in a controller without the necessity of separate hardware as in the existing hydraulic excavator.

Technical Solution

In accordance with one aspect of the present invention, there is provided an anti-rebounding control method in an electric swing system of a hybrid excavator, which includes comparing an electric motor speed feedback value that is a speed value fed back from an electric motor with a preset upper threshold speed value and a preset lower threshold speed value if an input speed command value is "0" (if an operator intends to stop a swing operation of an upper swing structure); setting a torque limit value to "0" if the electric motor speed feedback value is equal to or smaller than the upper threshold speed value and equal to or larger than the lower threshold speed value as the result of comparison, and setting a torque limit value to a maximum value so that a power is re-supplied to the electric motor if the electric motor speed feedback value is smaller than the lower threshold speed value (just before the electric motor stops); and intercepting the power that is supplied to the electric motor if the torque limit value is set to "0" and re-supplying the power to the electric motor if the torque limit value is set to the maximum value.

Preferably, the step of setting the torque limit value to "0" or the maximum value sets a predetermined rate limit (slope) and changes and sets the torque limit value to "0" or the maximum value in proportion to the set rate limit (slope), and the step of intercepting or supplying the power to the electric motor according to the set torque limit value intercepts or supplies the power in proportion to the set rate limit (slope).

In accordance with another aspect of the present invention, there is provided an anti-rebounding control apparatus in an electric swing system of a hybrid excavator, which includes an anti-rebounding controller outputting a first command for setting a torque limit value to "0" if an electric motor speed feedback value that is a speed value fed back from an electric motor is equal to or smaller than an upper threshold speed value and equal to or larger than a lower threshold speed value in the case where an input speed command value is "0" (in the case where an operator intends to stop a swing operation of an upper swing structure), and outputting a second command for setting the torque limit value to a maximum value so that a power is re-supplied to the electric motor if the electric motor speed feedback value is smaller than the lower threshold speed value (just before the electric motor stops); a torque regulator setting the torque limit value to "0" when the first command is input and setting the torque limit value to the maximum value so that the power is re-supplied to the electric motor when the second command is input; and an electric motor inverter intercepting the power that is supplied to the electric motor if the torque limit value is set to "0" and re-supplying the power to the electric motor if the torque limit value is set to the maximum value.

Preferably, the anti-rebounding controller includes a speed value comparison unit comparing the electric motor speed feedback value that is the speed value fed back from the electric motor with the preset upper threshold speed value and the preset lower threshold speed value if the input speed command value is "0" (if the operator intends to stop the swing operation of the upper swing structure); and a command output unit outputting the first command for setting the torque limit value to "0" if the electric motor speed feedback value is equal to or smaller than the upper threshold speed value and equal to or larger than the lower threshold speed value as the result of comparison and outputting the second command for setting the torque limit value to the maximum value so that the power is re-supplied to the electric motor if the electric motor speed feedback value is smaller than the lower threshold speed value (just before the electric motor stops).

Preferably, the torque regulator changes and sets the torque limit value to "0" or the maximum value in proportion to a set rate limit (slope), and the electric motor inverter intercepts or supplies the power in proportion to the set rate limit (slope).

Advantageous Effect

According to the present invention, the anti-rebounding system implemented in the existing hydraulic excavator can be implemented even in the electric motor swing control system of the hybrid excavator or the electric excavator.

Further, the electric motor inverter can be controlled by the anti-rebounding control algorithm implemented in the controller, and through this, the electric motor can be operated in the same manner as that in the anti-rebounding system that is implemented in the existing hydraulic system.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

101: anti-rebounding controller
102: torque regulator
103: electric motor inverter
104: electric motor

BEST MODE

Hereinafter, preferred embodiments of the present invention will be described in detail with reference to the accompanying drawings.

Figure 1:
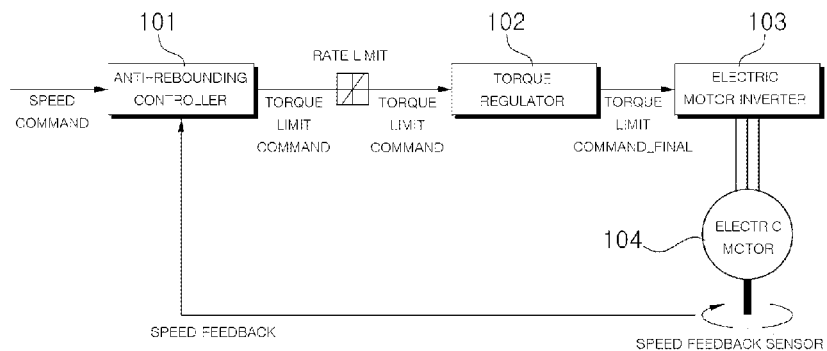
FIG. 1 is a block diagram of an anti-rebounding control apparatus in an electric swing system of a hybrid excavator according to the present invention.

FIG. 1 is a block diagram of an anti-rebounding control apparatus in an electric swing system of a hybrid excavator according to the present invention, As illustrated in FIG. 1, an anti-rebounding control apparatus is configured to include an anti-rebounding controller 101 including a speed value comparator and a command output unit, a torque regulator 102, an electric motor inverter 103, and an electric motor 104.

Here, the anti-rebounding controller 101 outputs a first command for setting a torque limit value to "0" if an electric motor speed feedback value that is a speed value fed back from an electric motor is equal to or smaller than an upper threshold speed value and equal to or larger than a lower threshold speed value if an input speed command value is "0" (if an operator intends to stop a swing operation of an upper swing structure), and outputs a second command for setting the torque limit value to a maximum value so that a power is re-supplied to the electric motor if the electric motor speed feedback value is smaller than the lower threshold speed value (just before the electric motor stops). Specifically, the anti-rebounding controller 101 is configured to include a speed value comparison unit (not illustrated) comparing the electric motor speed feedback value that is the speed value fed back from the electric motor with the preset upper threshold speed value and the preset lower threshold speed value if the input speed command value is "0" (if the operator intends to stop the swing operation of the upper swing structure); and a command output unit (not illustrated) outputting the first command for setting the torque limit value to "0" if the electric motor speed feedback value is equal to or smaller than the upper threshold speed value and equal to or larger than the lower threshold speed value as the result of comparison and outputting the second command for setting the torque limit value to the maximum value so that the power is re-supplied to the electric motor if the electric motor speed feedback value is smaller than the lower threshold speed value (just before the electric motor stops).

The torque regulator 102 sets the torque limit value to "0" when the first command is input from the anti-rebounding controller 101, and sets the torque limit value to the maximum value so as to re-supply the power to the electric motor 104 when the second command is input. At this time, the torque regulator 102 sets a predetermined rate limit (slope) for smooth stop of the upper swing structure without impact, and changes and sets the torque limit value to "0" or the maximum value in proportion to the set rate limit (slope).

If the torque limit value is set to "0" by the torque regulator 102, the electric motor inverter 103 intercepts the power being supplied to the electric motor 104, and if the torque limit value is set to the maximum value, the electric motor inverter 103 re-supplies the power to the electric motor 104. If the predetermined rate limit (slope) is set to maintain the smooth stop of the upper swing structure without impact, the electric motor inverter 103 intercepts or supplies the power in proportion to the set rate limit (slope).

Figure 2:
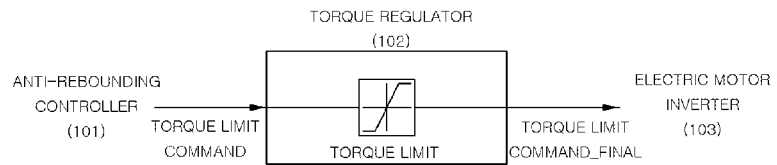
FIG. 2 is a conceptual diagram explaining torque limit setting of a torque regulator according to the present invention.

FIG. 2 is a conceptual diagram explaining torque limit setting of a torque regulator according to the present invention. As illustrated in FIG. 2, according to the present invention, the torque limit value can be changed for the anti-rebounding. For example, if the electric motor speed feedback value is equal to or smaller than the upper threshold speed value and equal to or larger than the lower threshold speed value, the torque limit value is changed from the maximum value to "0", and if the electric motor speed feedback value is smaller than the lower threshold speed value (just before the electric motor stops), the torque limit value is changed to the maximum value so that the power is re-supplied to the electric motor.

In addition, if the torque limit value is changed, the predetermined rate limit (slope) is set so that the upper swing structure can be smoothly stopped without impact, and the torque limit value is changed and set to "0" or the maximum value in proportion to the set rate limit (slope).

Next, the operation of the anti-rebounding control apparatus in the electric swing system of the hybrid excavator as illustrated in FIGS. 1 and 2 will be described with reference to FIG. 3.

Figure 3:
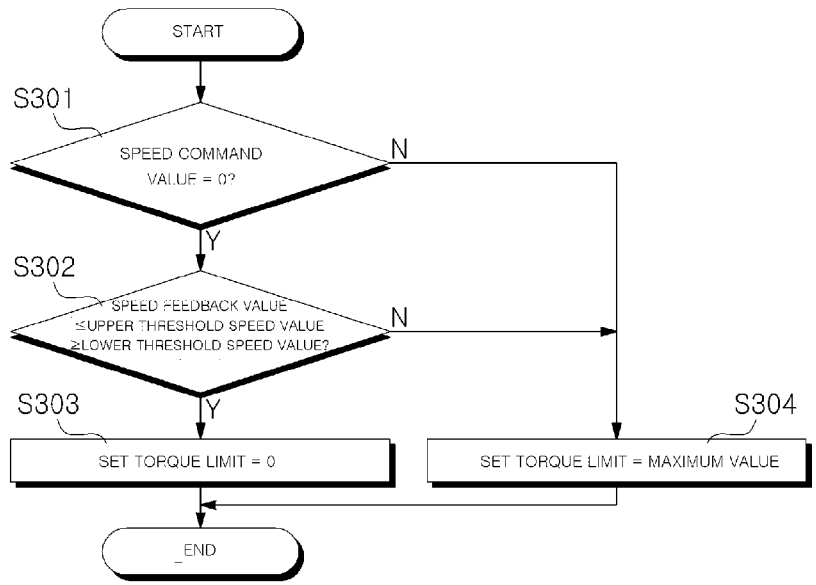
FIG. 3 is a flowchart illustrating in order the operation of an anti-rebounding control apparatus in an electric swing system of a hybrid excavator according to the present invention.

FIG. 3 is a flowchart illustrating in order the operation of an anti-rebounding control apparatus in an electric swing system of a hybrid excavator according to the present invention.

As illustrated in FIG. 3, according to the present invention, if the input speed command value is "0" (if the operator intends to stop the swing operation of the upper swing structure) (S301), the electric motor speed feedback value is compared with the preset upper threshold speed value and the preset lower threshold speed value (S302).

The speed command value is a speed command value that is desired by an operator with respect to the electric motor system, the motor speed feedback value is a speed value fed back from the electric motor, and the upper threshold speed value and the lower threshold speed value are parameter values set for the anti-rebounding control.

For reference, if the electric motor speed feedback value is equal to or smaller than the upper threshold speed value and equal to or larger than the lower threshold speed value as the result of comparison, the first command for setting the torque limit value to "0" is output.

That is, from the moment when the speed command value becomes "0", the speed of the electric motor is decreased, and if the decreased speed is equal to the upper threshold speed value, the torque limit value becomes "0". Accordingly, the electric motor is unable to receive the power for driving from the electric motor inverter.

Through this, the equipment is naturally stopped without rebounding due to the frictional torque of the equipment itself.

On the other hand, if the electric motor speed feedback value is smaller than the lower threshold speed value (just before the electric motor stops), the second command for setting the torque limit value to the maximum value is output so as to re-supply the power to the electric motor.

At the same time, a holding torque may be generated to maintain the present position.

Next, if the first command is input, the torque limit value is set to "0" (S303), and if the second command is input, the torque limit value is set to the maximum value so that the power can be re-supplied to the electric motor (S304).

At this time, the predetermined rate limit (slope) is set for the smooth stop of the upper swing structure without impact, and the torque limit value is changed and set to "0" or the maximum value in proportion to the set rate limit (slope).

Last, if the torque limit value is set to "0", the power that is supplied to the electric motor is intercepted, while if the torque limit value is set to the maximum value, the power is re-supplied to the electric motor.

At this time, if the predetermined rate limit (slope) is set for the smooth step without impact as described above, the power is intercepted or supplied in proportion to the set rate limit (slope).

As described above, the torque limit value is set to "0" if the electric motor speed feedback value that is the speed value fed back from the electric motor is equal to or smaller than the upper threshold speed value and equal to or larger than the lower threshold speed value in the case where the input speed command value is "0" (in the case where the operator intends to stop the swing operation of the upper swing structure), and the torque limit value is set to the maximum value so that the power can be re-supplied to the electric motor if the electric motor speed feedback value is smaller than the lower threshold speed value (just before the electric motor stops). Accordingly, the anti-rebounding system implemented in the existing hydraulic excavator can also be implemented even in the electric motor swing control system of the hybrid excavator or the electric excavator.

Last, referring to FIGS. 4A and 4B, the results of application of the anti-rebounding controller according to the present invention will be described.

Figure 4A:
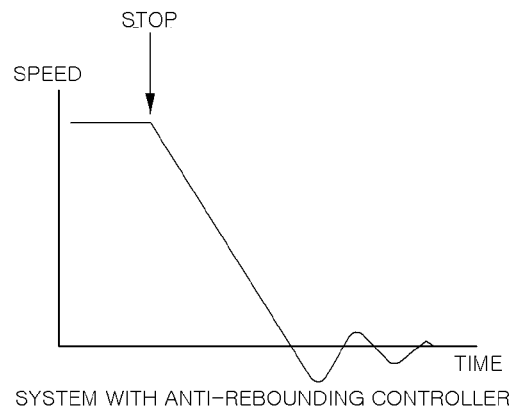
FIG. 4A is a diagram illustrating the state of a system to which an anti-rebounding controller according to the present invention is not applied.
Figure 4B:
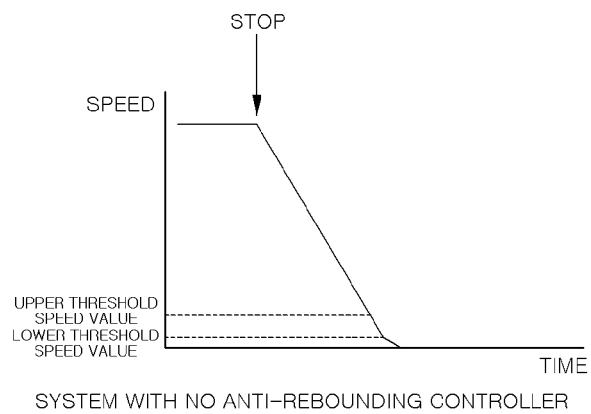
FIG. 4B is a diagram illustrating the state of a system to which an anti-rebounding controller according to the present invention is applied.

FIG. 4A is a diagram illustrating the state of a system to which an anti-rebounding controller according to the present invention is not applied, and FIG. 4B is a diagram illustrating the state of a system to which an anti-rebounding controller according to the present invention is applied.

As illustrated in FIG. 4A, in the system to which the anti-rebounding controller is not applied, oscillation is generated at the time when the upper swing structure is stopped, whereas in the system to which the anti-rebounding controller is applied according to the present invention, it can be seen that such oscillation has disappeared.

INDUSTRIAL APPLICABILITY

As apparent from the above description, the present invention can be used in the anti-rebounding control apparatus in the electric swing system of the hybrid excavator, and more particularly, the prevent invention can be used in the anti-rebounding control apparatus in the electric swing system of the hybrid excavator, which can implement the anti-rebounding control system in the electric motor system, and can realize the same performance as that of the anti-rebounding system that is used in the swing system of the existing hydraulic excavator even in the system that performs the swing operation using the electric motor such as the hybrid (or electric) excavator.

The invention claimed is:

1. An anti-rebounding control method in an electric swing system of a hybrid excavator, comprising:
    comparing an electric motor speed feedback value that is a speed value fed back from an electric motor with a preset upper threshold speed value and a preset lower threshold speed value if an input speed command value is "0" (if an operator intends to stop a swing operation of an upper swing structure);
    setting a torque limit value to "0" if the electric motor speed feedback value is equal to or smaller than the upper threshold speed value and equal to or larger than the lower threshold speed value as the result of comparison, and setting a torque limit value to a maximum value so that a power is re-supplied to the electric motor if the electric motor speed feedback value is smaller than the lower threshold speed value (just before the electric motor stops); and
    intercepting the power that is supplied to the electric motor if the torque limit value is set to "0" and re-supplying the power to the electric motor if the torque limit value is set to the maximum value.

2. The anti-rebounding control method according to claim 1, wherein the step of setting the torque limit value to "0" or the maximum value sets a predetermined rate limit (slope) and changes and sets the torque limit value to "0" or the maximum value in proportion to the set rate limit (slope), and
    the step of intercepting or supplying the power to the electric motor according to the set torque limit value intercepts or supplies the power in proportion to the set rate limit (slope).

3. An anti-rebounding control apparatus in an electric swing system of a hybrid excavator, comprising:
    an anti-rebounding controller outputting a first command for setting a torque limit value to "0" if an electric motor speed feedback value that is a speed value fed back from an electric motor is equal to or smaller than an upper threshold speed value and equal to or larger than a lower threshold speed value in the case where an input speed command value is "0" (in the case where an operator intends to stop a swing operation of an upper swing structure), and outputting a second command for setting the torque limit value to a maximum value so that a power is re-supplied to the electric motor if the electric motor speed feedback value is smaller than the lower threshold speed value (just before the electric motor stops);
    a torque regulator setting the torque limit value to "0" when the first command is input and setting the torque limit value to the maximum value so that the power is re-supplied to the electric motor when the second command is input; and
    an electric motor inverter intercepting the power that is supplied to the electric motor if the torque limit value is set to "0" and re-supplying the power to the electric motor if the torque limit value is set to the maximum value.

4. The anti-rebounding control apparatus according to claim 3, wherein the anti-rebounding controller comprises:
- a speed value comparison unit comparing the electric motor speed feedback value that is the speed value fed back from the electric motor with the preset upper threshold speed value and the preset lower threshold speed value if the input speed command value is "0" (if the operator intends to stop the swing operation of the upper swing structure); and
- a command output unit outputting the first command for setting the torque limit value to "0" if the electric motor speed feedback value is equal to or smaller than the upper threshold speed value and equal to or larger than the lower threshold speed value as the result of comparison and outputting the second command for setting the torque limit value to the maximum value so that the power is re-supplied to the electric motor if the electric motor speed feedback value is smaller than the lower threshold speed value (just before the electric motor stops).

5. The anti-rebounding control apparatus according to claim 3, wherein the torque regulator changes and sets the torque limit value to "0" or the maximum value in proportion to a set rate limit (slope), and
- the electric motor inverter intercepts or supplies the power in proportion to the set rate limit (slope).

* * * * *